J. S. BRUBAKER.
FEED-COOKERS.
No. 170,050. Patented Nov. 16, 1875.
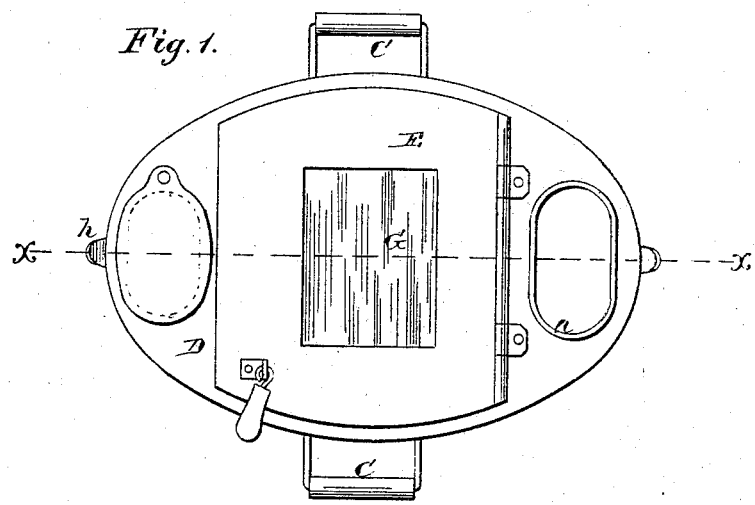
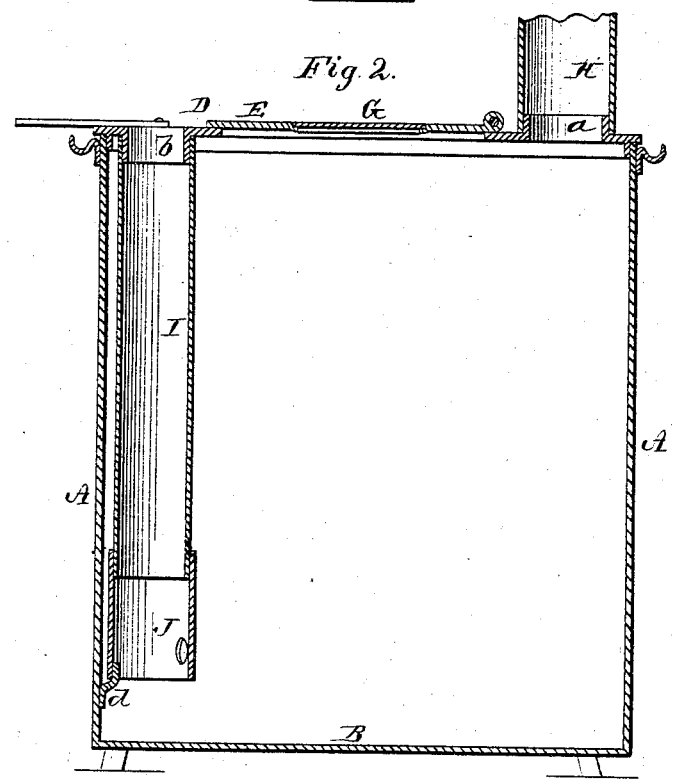

UNITED STATES PATENT OFFICE.

JACOB S. BRUBAKER, OF FREEPORT, ILLINOIS.

IMPROVEMENT IN FEED-COOKERS.

Specification forming part of Letters Patent No. 170,050, dated November 16, 1875; application filed October 21, 1875.

*To all whom it may concern:*

Be it known that I, JACOB S. BRUBAKER, of Freeport, in the county of Stephenson and in the State of Illinois, have invented certain new and useful Improvements in Feed-Cooker; and do hereby declare that the following is a full, clear, and exact description thereof, reference being had to the accompanying drawings, and to the letters of reference marked thereon, making a part of this specification.

The nature of my invention consists in the construction and arrangement of an agricultural boiler, as will be hereinafter more fully set forth.

In order to enable others skilled in the art to which my invention appertains to make and use the same, I will now proceed to describe its construction and operation, referring to the annexed drawing, in which—

Figure 1 is a plan view of my agricultural boiler or cooker. Fig. 2 is a longitudinal section of the same, through the line $x\ x$, Fig. 1.

A represents the body, and B the bottom, of the feed-cooker, made of galvanized iron, and the body A provided with a handle, C C, near the upper edge. D is the top of the cooker, made of cast-iron, and provided with a hinged lid or cover, E, in which is inserted mica or other transparent material, as shown at G. H is the smoke-pipe, placed over a collar, $a$, on the top D, in the usual manner. I is the draft-flue within the body A, the upper end of said flue being held by a collar, $b$, on the under side of the top D. On the lower end of the flue I is placed a cast-iron extension, J, which is supported on a hook or projection, $d$, extending from the inner side of the body A. By means of the collar $b$ and projection $d$ the draft-flue is held entirely free from the outside shell, thereby leaving the heat from the fire pass all around the inside of the cooker, without losing any of the surface of the cooker.

By the introduction of the isinglass or mica in the lid or cover E, it is not necessary to open said lid to ascertain the state of the fire inside, which would let in cold air and retard the boiling of the water surrounding the device.

There is no grate in my cooker, so that the fuel will lie on the bottom of the cooker, bringing the fire all around the sides and on the bottom, thereby causing the water to boil in about two-thirds of the time, and with less fuel than with the cookers now generally in use.

On each side or end of the body A is a small projecting catch or hook, $h$, for the purpose of catching a hook which is attached to the barrel, for holding down the cooker, or for keeping it from rising in the water.

The lower section J of the draft-flue being made of cast-iron obviates the necessity of repairing either from burning out or becoming drawn out of shape from the action of the fire coming in contact with it.

This cooker is used in the ordinary manner by being placed in a barrel or other large vessel containing the feed to be cooked or the water to be boiled.

Having thus fully described my invention, what I claim as new, and desire to secure by Letters Patent, is—

1. In a feed-cooker, the draft-tube I, provided with a cast-iron bottom piece, J, and held removed from the body of the cooker by means of the collar $b$ and hook $d$, substantially as and for the purposes herein set forth.

2. The hooked lugs or projections $h$, extending from the sides of the body A, substantially as and for the purposes herein set forth.

3. The combination of the case A B, having draft-tube I, with bottom piece J, collar $b$, hook $d$, top D, and hinged lid E, with mica G, all substantially as and for the purposes set forth.

In testimony that I claim the foregoing I have hereunto set my hand this 5th day of October, 1875.

JACOB S. BRUBAKER.

Witnesses:
SAMUEL DIEMER,
GEO. WOLF,